United States Patent
Kim et al.

(10) Patent No.: US 11,166,245 B2
(45) Date of Patent: *Nov. 2, 2021

(54) METHOD OF EFFICIENTLY REPORTING USER EQUIPMENT TRANSMISSION POWER AND APPARATUS THEREOF

(71) Applicant: Samsung Electronics Co., Ltd., Suwon-si (KR)

(72) Inventors: Sang Bum Kim, Seoul (KR); Soeng Hun Kim, Yongin-si (KR); Gert-Jan Van Lieshout, Staines (GB); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,812

(22) Filed: May 22, 2020

(65) Prior Publication Data

US 2020/0288414 A1    Sep. 10, 2020

Related U.S. Application Data

(63) Continuation of application No. 16/357,942, filed on Mar. 19, 2019, now Pat. No. 10,667,223, which is a
(Continued)

(51) Int. Cl.
*H04W 52/36* (2009.01)
*H04W 72/04* (2009.01)
(Continued)

(52) U.S. Cl.
CPC ....... *H04W 52/365* (2013.01); *H04W 52/545* (2013.01); *H04W 72/0413* (2013.01);
(Continued)

(58) Field of Classification Search
CPC .................. H04W 52/365; Y02B 60/50
(Continued)

(56) References Cited

U.S. PATENT DOCUMENTS

| 7,184,792 B2 | 2/2007 | Mir |
| 7,403,789 B2 | 7/2008 | Takano et al. |

(Continued)

FOREIGN PATENT DOCUMENTS

| CN | 101310546 A | 11/2008 |
| CN | 101646234 A | 2/2010 |

(Continued)

OTHER PUBLICATIONS

InterDigital Communications, Timing of SCell Activation in LTE CA, 3GPP TSG RAN WG2 #72bis, R2-110216, Dublin, Ireland, Jan. 11, 2011.

(Continued)

*Primary Examiner* — Lee Nguyen
(74) *Attorney, Agent, or Firm* — Jefferson IP Law, LLP

(57) ABSTRACT

A method and an apparatus for efficiently reporting user equipment (UE) are provided. A method of transmitting Power Headroom Report (PHR) of UE in a mobile communication system, includes configuring an evolved PHR including an indicator with respect of a variation factor of maximum transmission power of the UE, and transmitting the evolved PHR to an eNB. An eNB may know maximum transmission power of an UE and a variation factor thereof to enable efficient scheduling.

20 Claims, 6 Drawing Sheets

Related U.S. Application Data continuation of application No. 16/230,023, filed on Dec. 21, 2018, now Pat. No. 10,638,432, which is a continuation of application No. 15/650,191, filed on Jul. 14, 2017, now Pat. No. 10,165,527, which is a continuation of application No. 14/664,297, filed on Mar. 20, 2015, now Pat. No. 9,713,105, which is a continuation of application No. 14/520,812, filed on Oct. 22, 2014, now Pat. No. 9,681,400, which is a continuation of application No. 13/400,947, filed on Feb. 21, 2012, now Pat. No. 8,958,840.

(60) Provisional application No. 61/444,844, filed on Feb. 21, 2011, provisional application No. 61/471,872, filed on Apr. 5, 2011.

(51) Int. Cl.
  *H04W 52/54* (2009.01)
  *H04B 7/00* (2006.01)
  *H04W 88/08* (2009.01)
  *H04W 88/06* (2009.01)
  *H04W 52/22* (2009.01)

(52) U.S. Cl.
  CPC .......... *H04W 52/228* (2013.01); *H04W 88/06* (2013.01); *H04W 88/08* (2013.01); *Y02D 30/70* (2020.08)

(58) Field of Classification Search
  USPC .............. 455/522, 67.11, 226.1, 63.1, 127.1
  See application file for complete search history.

(56) References Cited

U.S. PATENT DOCUMENTS

| | | | |
|---|---|---|---|
| 8,260,297 | B2 | 9/2012 | Jeong et al. |
| 8,315,661 | B2 | 11/2012 | Zong |
| 8,867,440 | B2 | 10/2014 | Ho et al. |
| 8,917,643 | B2 | 12/2014 | Lee et al. |
| 8,958,840 | B2 | 2/2015 | Kim et al. |
| 8,989,025 | B2 | 3/2015 | Kazmi et al. |
| 9,054,835 | B2 | 6/2015 | Kwon et al. |
| 9,084,270 | B2 | 7/2015 | Dinan |
| 9,143,970 | B2 | 9/2015 | Park et al. |
| 9,307,498 | B2 | 4/2016 | Baldemair et al. |
| 9,713,105 | B2 | 7/2017 | Kim et al. |
| 9,794,900 | B2 | 10/2017 | Wu |
| 9,949,221 | B2 | 4/2018 | Yamada |
| 10,165,527 | B2 | 12/2018 | Kim et al. |
| 10,477,493 | B2 | 11/2019 | Marinier et al. |
| 10,779,358 | B2 | 9/2020 | Wei |
| 10,966,185 | B2 | 3/2021 | Park et al. |
| 2005/0069758 | A1 | 3/2005 | Kitao et al. |
| 2006/0003787 | A1 | 1/2006 | Heo et al. |
| 2007/0019668 | A1 | 1/2007 | Lee et al. |
| 2007/0117522 | A1 | 5/2007 | Axness et al. |
| 2007/0147337 | A1 | 6/2007 | Bosch et al. |
| 2008/0008152 | A1 | 1/2008 | Lohr et al. |
| 2008/0215948 | A1 | 9/2008 | Pinheiro et al. |
| 2009/0054055 | A1 | 2/2009 | Iwamura et al. |
| 2009/0143074 | A1 | 6/2009 | Pelletier et al. |
| 2009/0176500 | A1 | 7/2009 | Panico et al. |
| 2009/0191910 | A1 | 7/2009 | Athalye et al. |
| 2009/0201868 | A1 | 8/2009 | Chun et al. |
| 2009/0225709 | A1 | 9/2009 | Wager et al. |
| 2009/0232107 | A1 | 9/2009 | Park et al. |
| 2009/0232118 | A1 | 9/2009 | Wang et al. |
| 2009/0238098 | A1 | 9/2009 | Cai et al. |
| 2009/0239566 | A1 | 9/2009 | Pelletier et al. |
| 2009/0245191 | A1 | 10/2009 | Ball et al. |
| 2009/0259910 | A1 | 10/2009 | Lee et al. |
| 2010/0054237 | A1 | 3/2010 | Han et al. |
| 2010/0074202 | A1 | 3/2010 | Park et al. |
| 2010/0080181 | A1 | 4/2010 | Yamada et al. |
| 2010/0103873 | A1 | 4/2010 | Buracchini |
| 2010/0110897 | A1 | 5/2010 | Chun et al. |
| 2010/0118720 | A1 | 5/2010 | Gauvreau et al. |
| 2010/0142470 | A1 | 6/2010 | Park et al. |
| 2010/0158147 | A1 | 6/2010 | Zhang et al. |
| 2010/0159919 | A1 | 6/2010 | Wu |
| 2010/0189022 | A1 | 7/2010 | Pelletier et al. |
| 2010/0238830 | A1 | 9/2010 | Kim et al. |
| 2010/0240372 | A1 | 9/2010 | Wu |
| 2010/0254351 | A1 | 10/2010 | Wang et al. |
| 2010/0265873 | A1 | 10/2010 | Yi et al. |
| 2010/0265905 | A1 | 10/2010 | Lee et al. |
| 2010/0273515 | A1 | 10/2010 | Fabien et al. |
| 2010/0284376 | A1 | 11/2010 | Park et al. |
| 2010/0296454 | A1 | 11/2010 | Park et al. |
| 2010/0296467 | A1 | 11/2010 | Pelletier et al. |
| 2010/0296470 | A1* | 11/2010 | Heo .................. H04W 72/0406 370/329 |
| 2010/0296471 | A1 | 11/2010 | Heo et al. |
| 2010/0316026 | A1 | 12/2010 | Lee et al. |
| 2010/0331029 | A1 | 12/2010 | Linksy et al. |
| 2011/0002284 | A1 | 1/2011 | Talwar et al. |
| 2011/0026458 | A1 | 2/2011 | Gruber et al. |
| 2011/0158117 | A1 | 6/2011 | Ho et al. |
| 2011/0235609 | A1 | 9/2011 | Ahn et al. |
| 2011/0243048 | A1 | 10/2011 | Wang et al. |
| 2011/0243102 | A1 | 10/2011 | Sebire et al. |
| 2011/0243106 | A1 | 10/2011 | Hsu et al. |
| 2011/0249635 | A1 | 10/2011 | Chen et al. |
| 2011/0274040 | A1 | 11/2011 | Pani et al. |
| 2011/0317777 | A1 | 12/2011 | Huang et al. |
| 2012/0008600 | A1 | 1/2012 | Marinier et al. |
| 2012/0046060 | A1 | 2/2012 | Katayama |
| 2012/0083310 | A1 | 4/2012 | Zhao et al. |
| 2012/0087317 | A1 | 4/2012 | Bostrom et al. |
| 2012/0170570 | A1 | 7/2012 | Chang et al. |
| 2012/0178494 | A1 | 7/2012 | Haim et al. |
| 2012/0207112 | A1 | 8/2012 | Kim et al. |
| 2012/0224552 | A1 | 9/2012 | Feuersanger et al. |
| 2012/0243514 | A1 | 9/2012 | Pelletier et al. |
| 2012/0250520 | A1 | 10/2012 | Chen et al. |
| 2012/0287845 | A1 | 11/2012 | Yi et al. |
| 2012/0307821 | A1 | 12/2012 | Kwon et al. |
| 2013/0010619 | A1 | 1/2013 | Fong et al. |
| 2013/0021984 | A1 | 1/2013 | Han et al. |
| 2013/0053103 | A1 | 2/2013 | Kim et al. |
| 2013/0058315 | A1 | 3/2013 | Feuersanger et al. |
| 2013/0121203 | A1 | 5/2013 | Jung et al. |
| 2013/0142134 | A1 | 6/2013 | Zhu et al. |
| 2013/0188473 | A1 | 7/2013 | Dinan |
| 2013/0272279 | A1 | 10/2013 | Dinan |
| 2013/0279486 | A1 | 10/2013 | Kato et al. |
| 2014/0146779 | A1 | 5/2014 | Hsu et al. |
| 2014/0162642 | A1 | 6/2014 | Kwon et al. |
| 2014/0307670 | A1 | 10/2014 | Kim et al. |
| 2015/0088364 | A1 | 3/2015 | Sakayori et al. |
| 2015/0092713 | A1 | 4/2015 | Pelletier et al. |
| 2015/0189675 | A1 | 7/2015 | Feuersaenger et al. |
| 2015/0341885 | A1 | 11/2015 | Sebire et al. |
| 2016/0029207 | A1 | 1/2016 | Kim et al. |
| 2016/0081045 | A1 | 3/2016 | Bostrom et al. |
| 2016/0353393 | A1 | 12/2016 | Feuersaenger et al. |
| 2016/0373233 | A1 | 12/2016 | Pelletier et al. |
| 2017/0265185 | A1 | 9/2017 | Fong et al. |
| 2018/0234932 | A1 | 8/2018 | Zeng et al. |

FOREIGN PATENT DOCUMENTS

| | | |
|---|---|---|
| CN | 201550284 U | 8/2010 |
| CN | 101841905 A | 9/2010 |
| CN | 101848506 A | 9/2010 |
| CN | 101860971 A | 10/2010 |
| CN | 101869002 A | 10/2010 |
| CN | 101873713 A | 10/2010 |
| CN | 101908951 A | 12/2010 |
| CN | 101932087 A | 12/2010 |
| CN | 101932116 A | 12/2010 |
| CN | 101933281 A | 12/2010 |
| CN | 101946425 A | 1/2011 |

(56) References Cited

FOREIGN PATENT DOCUMENTS

| | | | |
|---|---|---|---|
| CN | 101951684 A | 1/2011 | |
| CN | 101958772 A | 1/2011 | |
| CN | 101978745 A | 2/2011 | |
| CN | 101998646 A | 3/2011 | |
| CN | 101998661 A | 3/2011 | |
| CN | 102204386 A | 9/2011 | |
| CN | 103119996 A | 5/2013 | |
| CN | 103141041 A | 6/2013 | |
| EP | 2 214 448 A1 | 8/2010 | |
| EP | 2 230 872 A1 | 9/2010 | |
| EP | 2 375 848 A1 | 10/2011 | |
| EP | 2 526 711 A1 | 11/2012 | |
| EP | 2 536 227 A2 | 12/2012 | |
| JP | 2010-034612 A | 2/2010 | |
| JP | 2011-508559 A | 3/2011 | |
| JP | 2012-529841 A | 11/2012 | |
| JP | 2013-533673 A | 8/2013 | |
| JP | 2014-506059 A | 3/2014 | |
| JP | 2014-510462 A | 4/2014 | |
| KR | 10-2008-0089421 A | 10/2008 | |
| KR | 10-2009-0101796 A | 9/2009 | |
| KR | 10-2010-0051023 A | 5/2010 | |
| KR | 10-2010-0116125 A | 10/2010 | |
| KR | 10-2010-0118067 A | 11/2010 | |
| KR | 10-2010-0126704 A | 12/2010 | |
| WO | 2009/154412 A2 | 12/2009 | |
| WO | 2010/065759 A2 | 6/2010 | |
| WO | 2010/074504 A2 | 7/2010 | |
| WO | 2010/107354 A1 | 9/2010 | |
| WO | 2010/116688 A1 | 10/2010 | |
| WO | 2010/121708 A1 | 10/2010 | |
| WO | 2010/124228 A2 | 10/2010 | |
| WO | 2010/127520 A1 | 11/2010 | |
| WO | 2010/129146 A2 | 11/2010 | |
| WO | 2010/145508 A1 | 12/2010 | |
| WO | 2011/002789 A1 | 1/2011 | |
| WO | 2011/019256 A2 | 2/2011 | |
| WO | 2011/150361 A1 | 12/2011 | |
| WO | 2012/108643 A2 | 8/2012 | |
| WO | 2012/108876 A1 | 8/2012 | |
| WO | 2012/115419 A2 | 8/2012 | |
| WO | 2012/130173 A1 | 10/2012 | |

OTHER PUBLICATIONS

Panasonic, UL activation and details of MAC CE for CC Management, 3GPP TSG RAN WG2 #70bis, R2-103605, Stockholm, Sweden, Jun. 22, 2010.
Qualcomm Incorporated, Supporting multiple timing advance groups, 3GPP TSG-RAN WG2 meeting#68bis, R2-100423 Valencia, Spain, XP050421077, Jan. 12, 2010.
Samsung, Main issues in supporting multi-TAs, 3GPP TSG RAN WG2#73BIS, R2-112305, Shanghai, China, XP959494626, Apr. 5, 2011.
Samsung, Signalling aspects of existing LTE-A parameters, 3GPP TSG RAN2 meeting #72bis, R2-110631, Dublin, Ireland, Jan. 25, 2011.
Korean Office Action dated Nov. 9, 2018, issued in the Korean Application No. 10-2012-0035573.
Extended European Search report dated Nov. 30, 2018, issued in the European Application No. 18202243.
Japanese Office Action dated Dec. 17, 2018, issued in the Japanese Patent Application 2013-554404.
"3rd Generation Partnership Project; Technical Specification Group Radio Access Network; Evolved Universal Terrestrial Radio Access (E-UTRA); Medium Access Control (MAC) protocol specification (Release 9)", 3GPP Standard; 3GPP TS 36.321, 3rd Generation Partnership Project (3GPP), Mobile Competence Centre; 650, Route Des Lucioles ; F-06921 Sophia-Antipolis Cedex, Jun. 17, 2010.
"3rd Generation Partnership Project; Technical Specification Group Radio Access Network; Evolved Universal Terrestrial Radio Access (E-UTRA); Radio Resource Control (RRC); Protocol specification (Release 9)", 3GPP Standard; 3GPP TS 36.331, 3rd Generation Partnership Project (3GPP), Mobile Competence Centre ; 650, Route Des Lucioles; F-06921 Sophia-Antipolis Cedex; France, No. V9.3.0, XP050441910, Jun. 17, 2010.
Ericsson et al.: "Timing Advance Maintenance for SCells", 3GPP Draft; R2-121558—Timing Advance Maintenance for Scells, 3rd Generation Partnership Project (3GPP), Mobile Competence Centre; 650, Route Des Lucioles; F-06921 Sophia-Antipolis Cedex; France, vol. RAN WG2, No. Jeju, South Korea; XP050606352, Mar. 20, 2012.
NTT DOCOMO, "Further discussions on LTE-A UE categories/capabilities", 3GPP Draft; R4-103847, Oct. 9, 2010.
Nokia Siemens Networks, et al., "UE capability signalling for CA and MIMO in REL10", 3GPP TSG RAN WG2 , R2-106892, Nov. 19, 2010.
Extended European Search Report dated Dec. 21, 2018, issued in European Application No. 18202354.9.
Indian Office Action dated Dec. 26, 2018, issued in Indian Application No. 2137/KOLNP/2013.
European Office Action dated Mar. 22, 2019, issued in European Application No. 12747557.2.
Indian Office Action dated Mar. 20, 2019, issued in Indian Application No. 2537/KOLNP/2013.
Indian Office Action dated May 17, 2019, issued in Indian Application No. 2863/KOLNP/2013.
Potevio et al., "Corrections to Extended PHR", 3GPP Draft; R2-111878 Corrections To Extended PHR, 3rd Generation Partnership Project (3GPP), Mobile Competence Centre ; 650, Route Des Lucioles; F-06921 Sophia-Antipolis Cedex; France, vol. RAN WG2, No. Shanghai, China; XP050494229, Apr. 3, 2011.
Alcatel-Lucent et al., R2-112210, SCell configuration for multiple TA, 3GPP TSG RAN WG2 #73bis, 3GPP, Apr. 4, 2011.
Alcatel-Lucent Shanghai Bell et al., R2-102372, Discussion on TA timer for LTE-A CA scenario, 3GPP, Apr. 5, 2010.
Samsung, R2-105401, Discussionon TAT expiry, 3GPP TSG RAN WG2#71bis, Oct. 5, 2010.
Alcatel-Lucent et al., R2-112208, DL reference & the need of TA grouping for multiple TA, 3GPP TSG RAN WG2 #73bis, Apr. 4, 2011.
Chinese Office Action dated Sep. 25, 2019 , issued in Chinese Application No. 201710086512.8.
Korean Office Action dated Jul. 18, 2019 , issued in Korean Application No. 10-2012-0035573.
Chinese Office Action dated Aug. 5, 2019 , issued in Chinese Application No. 201611001840.5.
Chinese Office Action dated Sep. 3, 2019 , issued in Chinese Application No. 201610886019.X.
Korean Office Action dated Sep. 18, 2019 , issued in Korean Application No. 10-2019-0074183.
Samsung, "Discussion on LTE fast dormancy", 3GPP TSG-RAN2 #71bis meeting, Oct. 11, 2010.
Intel Corporation Enhancements on MAC procedures to support CA with multiple TA, 3GPP TSG-RAN2 #73-bis meeting R2-112137, Apr. 4, 2011.
Chinese Office Action dated Dec. 27, 2019, issued in Chinese Application No. 201710146742.9.
Indian Office Action dated Oct. 14, 2019, issued in Indian Application No. 2870/KOLNP/2013.
Korean Notice of Allowance dated Oct. 29, 2019 issued in Korean Application No. 10-2012-0034308.
Chinese Office Action dated Oct. 25, 2019, issued in Chinese Application No. 201710591316.6.
Extended European Search Report dated Nov. 4, 2019, issued in European Application No. 19196752.0.
Chinese Office Action dated Nov. 20, 2019, issued in Chinese Application No. 201710940663.5.
Chinese Office Action dated Dec. 5, 2019, issued in Chinese Application No. 201710146741.4.
Japanese Office Action dated Jun. 8, 2020, issued in Japanese Patent Application No. 2019-035889.
Alcatel-Lucent, "Introduction of new PHR trigger to indicate the configured maximum UE power variation", R2-106896, 3GPP TSG-RAN2, Dec. 19, 2010.

(56) References Cited

OTHER PUBLICATIONS

Ericsson et al., Adding a Power Management Indication in PHR, Change Request, 3GPP TSG-RAN2 Meeting #73, Taipei, Taiwan, Feb. 21-25, 2011, R2-110940.
Ericsson et al., Power Management Indication in PHR, 3GPP TSG-RAN WG2#73, Taipei, Taiwan, Feb. 21-25, 2011, Tdoc R2-110941.
3rd Generation Partnership Project; Technical Specification Group Radio Access Network; Evolved Universal Terrestrial Radio Access (E-UTRA); Radio Resource Control (RRC); Protocol Specification (Release 10), Dec. 2010, pp. 56, 59, 63, 159-161, and 238, 3GPP TS 36.331 V10.0.0.
InterDigital, PHR Triggering for SAR, 3GPP TSG RAN WG2 #72-bis, Dublin, Ireland, Jan. 17-21, 2011, R2-110220.
Qualcomm Incorporated, PHR Trigger for Power Reduction Due to Power Management, Change Request, 3GPP TSG-RAN2 Meeting #73, Taipei, Taiwan, Feb. 21-25, 2011, R2-110797.
Qualcomm Incorporated; Power Management Based PHR Trigger; 3GPP TSG-RAN2 Meeting #72bis R2-110177; Jan. 17-21, 2011; Dublin, Ireland.
Nokia Siemens Networks et al.; PHR/P CMAX.c triggering and reporting; 3GPP TSG-RAN WG2 Meeting #72bis; R2-110378; Jan. 17-21, 2011; Dublin, Ireland.
Qualcomm Incorporated; Power Management Based PHR Trigger; 3GPP TSG-RAN2 Meeting #72bis R2-110656; Jan. 17-21, 2011; Dublin, Ireland.
NTT DOCOMO, Inc.; P-MPR related PHR triggering condition; 3GPP TSG-RAN WG2 #73; R2-111245; Feb. 21-25, 2011; Taipei, Taiwan.
3rd Generation Partnership Project; Technical Specification Group Radio Access Network; Evolved Universal Terrestrial Radio Access (E-UTRA); Medium Access Control (MAC) protocol specification (Release 10), 3GPP TS 36.321 V10. 0.0, Dec. 2010, URL; http://www.3gpp.org/ftp/Specs/archive/36_series/36.321/36321-a00.zip (document with the well-known feature; newly cited document).
3rd Generation Partnership Project; Technical Specification Group Radio Access Network; Evolved Universal Terrestrial Radio Access (EUTRA); Medium Access Control (MAC) protocol specification (Release10), 3GPP TS 36.321, V10.0.0, Dec. 17, 2010, pp. 1-53, XP050462124, Sophia-Antipolis, France.
Huawei et al., Consideration on DRX in elCIC scenario, 3GPP Draft, R2-111021 , Feb. 14, 2011, XP050493546, Taipei.
Alcatel-Lucent et al., RRC signalling design for Almost Blank Subframe patterns, 3GPP Draft, R2-106451, Nov. 9, 2010, XP050492280, Jacksonville, USA.
Research in Motion UK Limited, UE power saving for elCIC, 3GPP Draft, R2-111233, Feb. 15, 2011, XP050493735, Taipei, Taiwan.
ZTE, Clarification of Timing Requirements for Activation and Deactivation of SCells in TDD mode, 3GPP Draft, R4-110871, Feb. 16, 2011, XP050500940, Taipei.
Interdigital Communications, Report of Email discussion #26 on SCell Activation in LTE CA, 3GPP Draft, R2-111384, Feb. 18, 2011, XP050605673, Taipei, Taiwan.
3rd Generation Partnership Project; Technical Specification Group Radio Access Network; Evolved Universal Terrestrial Radio Access (E-UTRA); Physical layer procedures (Release 10), 3GPP TS 36.213, V10.0.1, Dec. 28, 2010, pp. 1-98, XP050462385, Sophia-Antipolis, France.
E-mail rapporteur (NTT DOCOMO, Inc.), CA support for multi-TA, 3GPP TSG-RAN2#69, R2-101567, Feb. 2010, San Francisco, U.S.A.
Samsung, CSI reporting and SRS timing upon SCell activation/deactivation, 3GPPTSG-RAN1#63bis, R1-110069, Dublin, Ireland, Jan. 21, 2011.
3GPP TS 36.321 V10.1.0, Medium Access Control (MAC) protocol specification (Release 10), Mar. 31, 2011, Sophia Antipolis, France.
CCL/ITRI, Random Access Transmission with Priority in E-UTRA Uplink, 3GPP Draft, R1-060140, 3rd Generation Partnership Project (3GPP), XP050417569, Jan. 23-25, 2006, Helsinki, Finland.

Ericsson, ST-Ericsson, Qualcomm Incorporated, Nokia Siemens Networks, Adding a Power Management indication in PHR [online], 3GPP TSG-RAN2 #73, R2-111601, Feb. 21-25, 2011, Taipei, Taiwan.
MediaTek Inc., Rel-10 PHR for non-CA UE, 3GPP TSGRAN, WG2 Meeting #72bis, R2-110244, Jan. 17-21, 2011, Dublin, Ireland.
Qualcomm Incorporated, "Definition of Pcmax,c", 3GPP TSG RAN4 #57AH, R4-110567, Jan. 17-21, 2010, Austin, Texas, USA.
Samsung, SCell Deactivation and CQI Reporting, 3GPP TSG-RAN2 Meeting #73, Feb. 21-25, 2011, Taipei, Taiwan, R2-110881.
LG Electronics Inc., CQI Reporting at Deactivation, 3GPP TSG-RAN2 Meeting #73, Feb. 21-25, 2011, Taipei, Taiwan, R2-111225.
ZTE, SCell Measurement Requirements for Carrier Aggregation (CA), 3GPP TSG-RAN WG4 Meeting #57AH, Jan. 17-21, 2011, Austin, Texas, USA, R4-110363.
Fujitsu, Clarifications on PHR, 3GPP TSG-RAN WG2 Meeting #72bis, Jan. 17-21, 2011, Dublin, Ireland, R2-110214.
Ericsson, St-Ericsson, Corrections to the Carrier Aggregation functionality in MAC, 3GPP TSG-RAN2 Meeting #72bis, Jan. 17-21, 2011, Dublin, Ireland, R2-110664, XP050540023.
Interdigital Communications, TAT Operation in LTE 11 CA, 3GPP Draft; R2-114265, 3rd Generation Partnership Project, Mobile Competence Centre, vol. RAN WG2, Aug. 22-26, 2011, Athens, Greece.
3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331 V10.0.0, Dec. 19, 2010.
HTC, SCells re-activation issues, 3GPP TSG-RAN WG2 Meeting # 73, R2-111387, <URL:http://www.3gpp.org/ftp/tsg_ran/WG2_RL2/TSGR2_73/Docs/R2-111387.zip> Taipei, Taiwan, Feb. 19, 2011.
Pantech, Feedback issues for Macro site CoMP, 3GPP TSG RAN Working Group 1 Meeting #64, R1-110756, <URL:http://www.3gpp.org/ftp/tsg_ran/WG1_RL1/TSGR1_64/Docs/R1-110756.zip>Taipei, Feb. 17, 2011.
Nokia Corporation, Nokia Siemens Networks, Uplink Activation & Deactivation of SCells, 3GPP TSG-RAN WG2 Meeting #71bis, R2-105529, Xian, China, Oct. 5, 2010.
ZTE, Consideration on SCell RLM in Carrier Aggregation, 3GPP TSG-RAN WG4 meeting AH#4, R4-103527, Oct. 7, 2010, Xi'an, China.
InterDigital Communications, Explicit Uplink SCC Deactivation in LTE CA, 3GPP TSG RAN WG2 #71, Tdoc R2-104816, Aug. 17, 2010, Madrid, Spain.
ZTE, Discussion on activation and deactivation MAC CE, 3GPP TSG RAN WG2 #72, R2-106330, Nov. 9, 2010, Jacksonville, USA.
Panasonic, Deactivation timing of SCells, 3GPP TSG RAN WG2 #73, R2-110891, Feb. 15, 2011, Taipei, Taiwan.
ZTE, Impact analysis of multipe TA, 3GPP TSG RAN WG2 #68bis, R2-100308, Jan. 12, 2010, Valencia, Spain.
ZTe, Discussion on Multiple TA, 3GPP TSG-RAN WG2 Meeting #73bis, R2-111908, Apr. 4, 2011, Shanghai, China.
Korean Office Action dated Aug. 31, 2018, issued in the Korean application No. 10-2012-0035228.
Korean Office Action dated Sep. 3, 2018, issued in the Korean application No. 10-2012-0013283.
Korean Office Action dated Sep. 4, 2018, issued in the Korean application No. 10-2012-0017211.
Korean Office Action dated Sep. 17, 2018, issued in the Korean application No. 10-2012-0035238.
Korean Decision to Grant dated Sep. 28, 2018, issued in the Korean application No. 10-2012-0013941.
Chinese Office Action dated Sep. 29, 2018, issued in the Chinese application No. 201610533609.4.
Korean Decision to Grant dated Nov. 1, 2018, issued in the Korean application No. 10-2012-0015361.
ITRI, Time Alignment Timer for different TA, 3GPP TSG RAN WG2 #68bis, R2-100560, Valencia, Spain, Jan. 12, 2010.
TSG-RAN WG4, Draft LS on P-MPR in Conformance Testing, 3GPP TSG-RAN WG4 #58AH, R4-111790, Shanghai, China, Apr. 15, 2010.
Korean Office Action dated Oct. 7, 2020, issued in Korean Application No. 10-2019-0074183.
Japanese Office Action dated Dec. 7, 2020, issued in Japanese Application No. 2018-222396.

(56) References Cited

OTHER PUBLICATIONS

Alcatel-Lucent, Alcatel-Lucent Shanghai Bell, "PCMAX,c signalling optimisation", 3GPP TSG-RAN WG2 Meeting #72bis, R2-110139, Jan. 10, 2011.
Interdigital Communications, "Release of PUCCH resources and removal of SCell Configuration", 3GPP Draft, R2-104814 (Handling PUCCH an and Scell Configuration), 3rd Generation Partnership Project (3GPP), Mobile Competence Centre, 650, Route Des Lucioles, F-06921 Sophia-Antipolis Cedex, France, vol. RAN WG2. Madrid, Spain, Aug. 23, 2010, Aug. 17, 2010, XP050451955.
Interdigital, "UE Actions at TAT Expiration with LTE CA", 3GPP Draft, R2-103774 (TAT Expiration With CA). 3rd Generation Partnership Project (3GPP), Mobile Competence Centre, 650, Route Des Lucioles, F-06921 Sophia-Antipolis Cedex, France, vol. RAN WG2. Stockholm, Sweden, Jun. 28, 2010-Jul. 2, 2010, Jun. 22, 2010, XP050605227.
Catt et al., "TAT expiry in CA", 3GPP Draft, R2-104508, 3rd Generation Partnership Project (3GPP), Mobile Competence Centre, 650, Route Des Lucioles, F-06921 Sophia-Antipolis Cedex, France, vol. RAN WG2, Madrid, Spain, Aug. 23, 2010, Aug. 17, 2010, XP050451875.
Japanese Office Action dated Jan. 4, 2021, issued in Japanese Patent Application No. 2019-035889.
Extended European Search Report dated Jan. 21, 2021, issued in European Patent Application No. 20199027.2.
HT MMOBILE Inc., "Correction to PHR triggering", 3GPP TSG-WG2 Meeting #70, R2-102724, May 10, 2010-May 14, 2010, XP050422864, Montreal, Canada.
LG Electronics Inc. et al., "Correction to PHR functionality", 3GPP TSG-RAN2 Meeting #65, R2-091978, Feb. 9, 2009-Feb. 13, 2009, XP050339712, Athens, Greece.
Samsung, "PHR timer handling after handover", 3GPP TSG-RAN2 Meeting #66, R2-093431, May 4, 2009-May 8, 2009, XP050340517, San Francisco, USA.
European Summons to attend oral proceedings dated Apr. 30, 2021, issued in European Patent Application No. 12747557.2.
Huawei, RRC reconfiguration message structure for CA, 3GPP TSG RAN WG2 #70bis, R2-103789, Jun. 22, 2010.
Korean Office Action dated Aug. 12, 2021, issued in Korean Patent Application No. 10-2021-0062455.
Chinese Office Action dated Aug. 16, 2021, issued in Chinese Patent Application No. 201710978292.X.

* cited by examiner

METHOD OF EFFICIENTLY REPORTING USER EQUIPMENT TRANSMISSION POWER AND APPARATUS THEREOF

CROSS-REFERENCE TO RELATED APPLICATION(S)

This application is a continuation application of a prior application Ser. No. 16/357,942, filed on Mar. 19, 2019, which is a continuation application of a prior application Ser. No. 16/230,023, filed on Dec. 21, 2018, and issued as U.S. Pat. No. 10,638,432 on Apr. 28, 2020, which is a continuation application of a prior application Ser. No. 15/650,191, filed on Jul. 14, 2017, and issued as U.S. Pat. No. 10,165,527 on Dec. 25, 2018, which is a continuation application of a prior application Ser. No. 14/664,297, filed on Mar. 20, 2015, and issued as U.S. Pat. No. 9,713,105 on Jul. 18, 2017, which is a continuation application of a prior application Ser. No. 14/520,812, filed on Oct. 22, 2014, and issued as U.S. Pat. No. 9,681,400 on Jun. 13, 2017, which is a continuation application of a prior application Ser. No. 13/400,947, filed on Feb. 21, 2012, and issued as U.S. Pat. No. 8,958,840 on Feb. 17, 2015, and was based on and claimed priority under 35 U.S.C. § 119(e) of a U.S. Provisional application Ser. No. 61/444,844, filed on Feb. 21, 2011, in the U.S. Patent and Trademark Office, and of a U.S. Provisional application Ser. No. 61/471,872, filed on Apr. 5, 2011, in the U.S. Patent and Trademark Office, the disclosure of each of which is incorporated by reference herein in its entirety.

BACKGROUND OF THE INVENTION

Field of the Invention

The present disclosure relates to a method of efficiently reporting user equipment (UE) transmission power and an apparatus thereof, and more particularly, to a method of reporting UE transmission power including a variation factor of maximum transmission power of a UE, and an apparatus thereof.

Description of the Related Art

In general, a mobile communication system has been developed to provide communication while securing mobility of a user. The mobile communication system leads to a stage capable of providing high speed data communication service as well as voice communication with dramatic development of technology.

In recent years, a standard work with respect to Long Term Evolution (LTE) in 3GPP as one of next generation mobile communication systems proceeds. LTE aims at commercialization in 2010, and is a technology implementing high speed packet based communication having transmission of maximum 100 Mbps greater than a currently provided data transmission rate. To do this, various approaches have been discussed. For example, an approach of simplifying a construction of a network to reduce the number of nodes located on a communication line or an approach approximating wireless protocols to a wireless channel to the maximum degree have been discussed.

Meanwhile, a resource to be allotted in a data service is determined according to an amount of data to be transmitted and a channel situation unlike a voice service. Accordingly, management allotting a transmission resource is achieved in consideration of an amount in a wireless communication system like a mobile communication system. This is equally performed in LTE being one of next generation mobile communication systems, and a scheduler located at a base station manages and allots a wireless transmission resource.

LTE-Advanced (LTE-A) communication system improving transmission speed by combining various new techquies with an LTE communication system has been actively discussed. There is carrier aggregation as a representative example of newly introduced technologies. Unlike the related art where a UE performs data transmission/reception using one forward carrier and one reverse carrier, one UE use a plurality of forward carriers and a plurality of reverseward carriers in the carrier aggregation. Accordingly, unlike the related art, it is necessary to efficiently set UE transmission power for a plurality of reverse carries. To do this, it is very important to report UE maximum transmission power and available power by a UE.

Development of the LTE communication system makes one UE possible to perform a dual mode function having a plurality of system modems. Further, the UE may receive provision of separate services using different systems. It is important to report UE maximum transmission power and available power used by each system for scheduling.

SUMMARY OF THE INVENTION

The present disclosure has been made in view of the above problems, and provides a method that may include a variation factor of maximum transmission power of a UE in a transmission power report and an apparatus thereof.

The present disclosure further provides a method capable of reporting whether a various factor of maximum transmission power of a UE is P-MPR.

In accordance with an aspect of the present disclosure, a method of transmitting Power Headroom Report (PHR) of user equipment (UE) in a mobile communication system is provided. The method includes configuring an evolved PHR including an indicator with respect of a variation factor of maximum transmission power of the UE, and transmitting the evolved PHR to an eNB.

In accordance with another aspect of the present disclosure, a method of receiving Power Headroom Report (PHR) of an eNB in a mobile communication system is provided. The method includes transmitting control information indicating application of an evolved PHR including an indicator with respect to a variation factor of maximum transmission power of user equipment (UE) to the UE, and receiving the evolved PHR from the UE.

In accordance with another aspect of the present disclosure, an apparatus of transmitting Power Headroom Report (PHR) of user equipment (UE) in a mobile communication system is provided. The apparatus includes a controller configuring an evolved PHR including an indicator with respect of a variation factor of maximum transmission power of the UE, and a transceiver transmitting the evolved PHR to an eNB.

In accordance with another aspect of the present disclosure, an apparatus of receiving Power Headroom Report (PHR) of an eNB in a mobile communication system is provided. The apparatus includes a controller generating control information indicating application of an evolved PHR including an indicator with respect to a variation factor of maximum transmission power of user equipment (UE), and a transceiver transmitting the control information and receiving the evolved PHR from the UE.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

In an LTE system, transmission power which a UE may use is a Power Headroom (PH), which is defined as a difference between UE maximum transmission power $P_{CMAX}$ and currently used UE transmission power. If certain conditions meet, the UE reports PH to a base station, which is called Power Headroom Report (PHR). In the related art, certain conditions reporting the PHR by the UE where a wireless path is changed by greater than a predetermined threshold value, or when a PH report period comes. The base station (eNB) may anticipate a channel state used by a corresponding UE based on collected PH values, and determine whether to additional allot a wireless resource to a corresponding UE. The PH continuously changes due to variation of UE maximum transmission power $P_{CMAX}$, variation of wave path loss, or TPC command error. Due to this, the base station may wrongly allot a wireless resource.

Figure 1A:
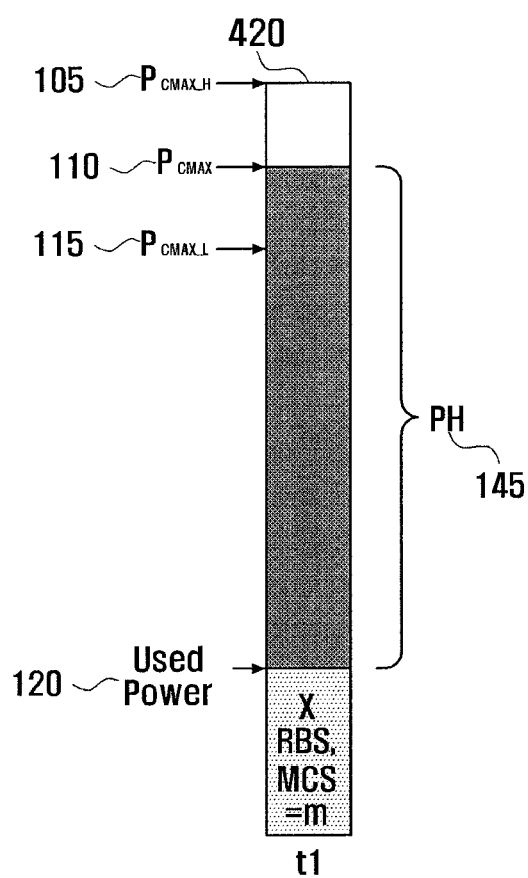
FIGS. 1A and 1B are views illustrating a case where a base station performs undesirable scheduling.
Figure 1B:
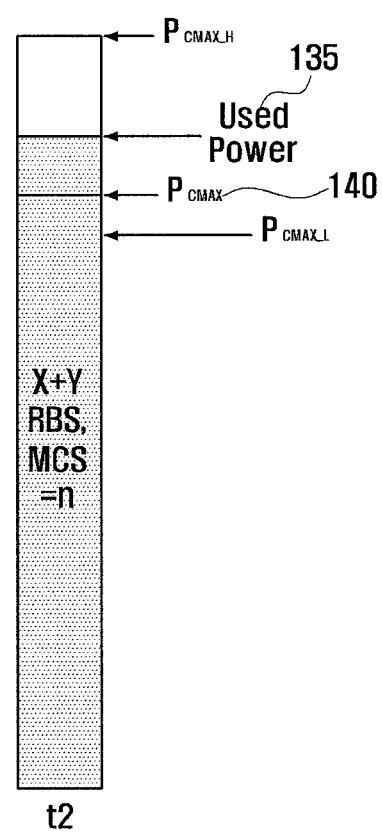

FIGS. 1A and 1B are views illustrating a case where a base station performs undesirable scheduling.

FIG. 1A illustrates a UE power use rate at a time t1. A maximum value $P_{CMAX\_H}$(105) and a minimum value $P_{CMAX\_L}$(115) of the UE maximum transmission power $P_{CMAX}$(110) are determined using a parameter provided from a base station and previously defined parameters, as one value within the range.

At time t1, the UE receives allotment of x wireless resources of Resource Block (RB) and transmits data with MCS (Modulation & Coding Scheme)=m. In this case, UE transmission power 120 is very less than UE maximum transmission power 110. If certain conditions meet, the UE transfers a PH 145 being a difference between the maximum transmission power $P_{CMAX}$(110) and used transmission power 120 to a base station.

Although more wireless resources are allotted to the UE based on the PH value, the eNB determines that the UE transmission power is not lack. Accordingly, the eNB further allots y RBs, and increase MCS to n higher than a previous m so as to provide a service with a higher transmission rate.

FIG. 1B illustrates a UE power use rate at time t2. As illustrated in FIG. 1B, necessary transmission power 135 is greatly increased but maximum transmission power $P_{CMAX}$ (140) is reduced not to influence on necessary transmission power. This is why the maximum transmission power $P_{CMAX}$ (140) varies due to causes such as an amount and a location of Physical Resource Block (PRB), a bandwidth of a system, a frequency band, and the number of scheduled carriers.

Accordingly, in a method of solving such a problem, a UE reports maximum transmission power, and a eNB collects the information, and considers and calculates UE maximum transmission power which is changed in a plurality of situations. However, it is not sufficient to collect only UE maximum transmission power. The eNB should know by what causes the UE maximum transmission power is changed to have meaning information.

In order to confirm factors influencing on the UE maximum transmission power, a reference determining UE maximum transmission power should be grasped. As illustrated above, a maximum value $P_{CMAX\_H}$ and a minimum value $P_{CMAX\_L}$ of the UE maximum transmission power $P_{CMAX}$ are determined using a parameter provided from an eNB and previously defined parameters, which is determined as one value within the range.

That is, $$P_{CMAX\_L} \leq P_{CMAX} \leq P_{CMAX\_H} \qquad \text{Equation 1}$$

where, the maximum value $P_{CMAX\_H}$ and the minimum value $P_{CMAX\_L}$ are defined using following Equation 2 and Equation 3.

$$P_{CMAX\_L} = \text{MIN}\{P_{CMAX} - \Delta Tc, P_{PowerClass} - \text{MAX}(MPR + A\text{-}MPR, P\text{-}MPR) - \Delta Tc\} \qquad \text{Equation 2}$$

$$P_{CMAX\_H} = \text{MIN}\{P_{EMAX}, P_{PowerClass}\} \qquad \text{Equation 3}$$

$P_{EMAX}$ is maximum transmission power provided from the base station and is transferred to the UE through SIB1 being broadcast information. Meanwhile, $P_{PowerClass}$ is maximum transmission power which each UE may provide. $P_{CMAX\_H}$ is defined as a minimum value of the $P_{EMAX}$ and the $P_{PowerClass}$.

In the meantime, $P_{CMAX\_L}$ is complicated. The $P_{CMAX\_L}$ is chiefly influenced by MPR+A-MPR and P-MPR. $\Delta Tc$, MPR, A-MPR are parameters defining a limit value which a UE may adjust maximum transmission power in a serving cell to match unintended with respect to an adjacent channel with predetermined required conditions.

MPR is a value determined by an amount (namely, bandwidth) and a modulation scheme that the UE receives allotment. A-MPR is a value determined by a frequency band in which a reverse transmission is achieved, local characteristics, and a bandwidth of reverse transmission. When there is a frequency band specifically sensitive to spurious radiation at a periphery, the A-MPR is used according to local characteristics and frequency band characteristics. When reverse transmission is performed at an edge of a frequency band, $\Delta Tc$ is used to allow additional transmission power adjustment. When the reverse transmission is achieved at a band corresponding to a minimum 4 MHz of an operational frequency band or a band corresponding to a maximum 4 MHz, the UE sets $\Delta Tc$ to 1.5 dB. In other cases, the UE sets $\Delta Tc$ to 0.

P-MPR is transmission output reduced value applied to satisfy Specific Absorption Rate (SAR) requiring conditions (to control an influence of the electromagnetic wave on a human body), and is determined in consideration of a distance between a device and the human body. For example, when a distance between the device and the human body is near, a total transmission output value of the device should be reduced. To do this, a great value is applied to P-MRP.

Conversely, when the distance between the device and the human body is great, because the total transmission output value of the device may be increased, a small value is applied to the P-MPR.

The P-MRP is related to power management. When a plurality of carries are simultaneously operated or transmit data together with another system modem, the P-MRP limits maximum power allotted to one carrier or one system. Such an influence is reflected as P-MPR.

Accordingly, it will be understood that the UE maximum transmission power $P_{CMAX}$ is changed by two factors including MPR+A-MPR associated with out-of-band emission requirement or a P-MPR associate with power management. If the UE reports one indicator capable of discriminating two factors together with maximum transmission power, an eNB may consider and calculate how the UE maximum transmission power is changed for various situations.

The present disclosure suggests a method of transferring one bit indicator indicating a variation cause of UE maximum transmission power and maximum transmission power.

In the present disclosure, a corresponding 1 bit indictor is called a p bit. The corresponding indicator is configured by 1 bit. A '0' indicates a case where the maximum transmission power is not influenced by a P-MPR for power management. A '1' indicates a case where the maximum transmission power is influenced by the P-MPR for power management.

That is, the P-MPR is applied and $P_{CAMX,C}$ has a different value, the p bit is set to 1. When the P-MPR is applied or not, if the $P_{CMAX,C}$ is the same, the p bit is set to 0.1. To do this, unlike a conventional PHR format, an enlarge PHR format may be used to include additional information. In addition to a conventional PHR trigger condition, when the P-MPR is changed by greater than a certain threshold, the PHR is triggered.

Figure 2:
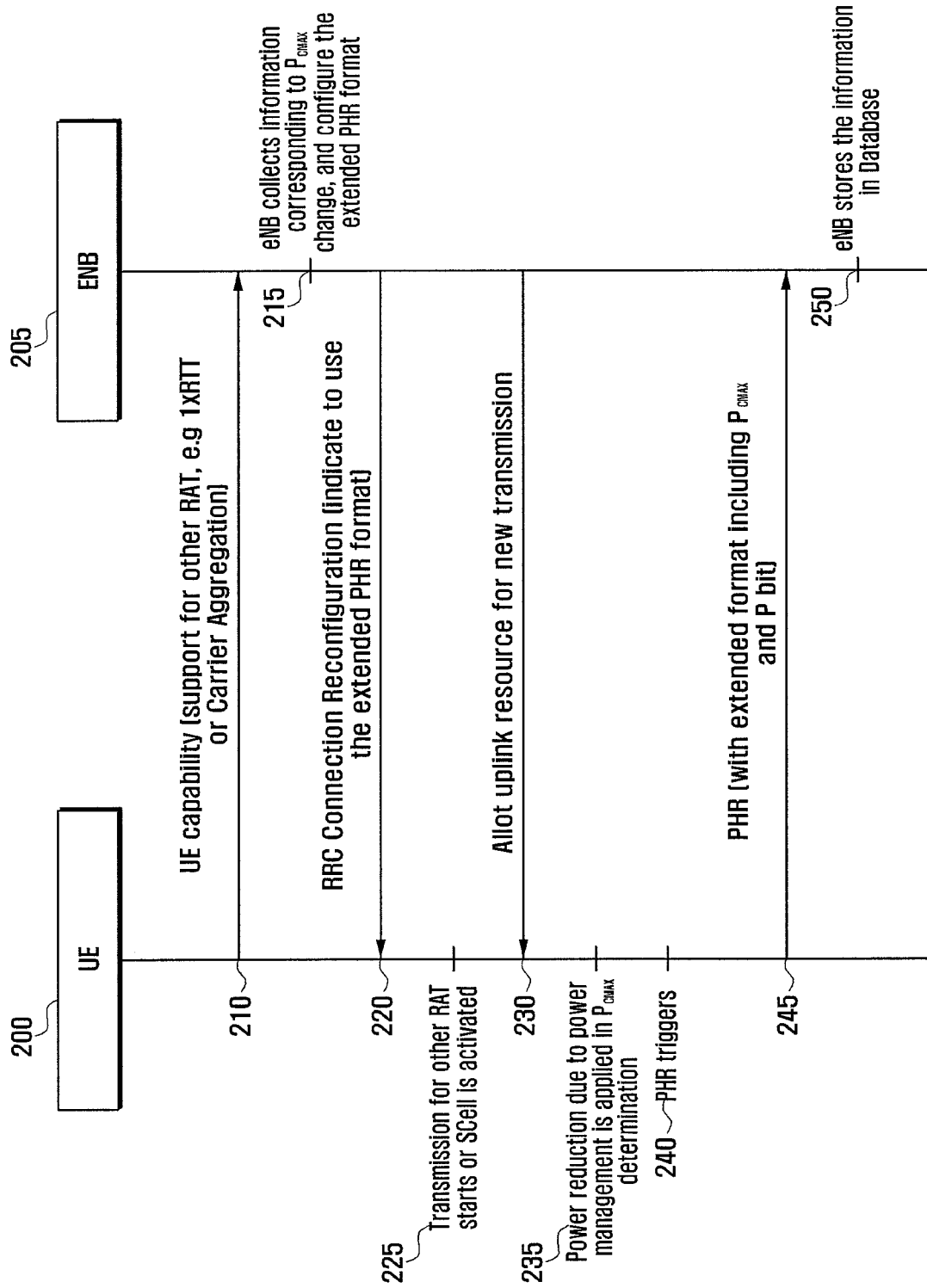
FIG. 2 is a scheme diagram illustrating a procedure of transmitting and receiving a PHR according to an embodiment of the present disclosure.

FIG. 2 is a scheme diagram illustrating a procedure of transmitting and receiving a PHR according to an embodiment of the present disclosure.

A UE 200 informs a base station (evolved NodeB; eNB) that the UE 200 may support another RAT or carrier aggregation (CA) (210). The eNB determines collection of information with respect to $P_{CMAX}$ variation for various situations, and using an evolved PHR format (215).

The eNB instructs application of the evolved PHR format to the UE through RRC Connection Reconfiguration message (220). Presence of application of the evolved PHR format is instructed through MAC-MainConfig IE and other PHR relation setting information is included in the PHR-config IE. The UE transmits data through another RAT or recognizes that data transmission is necessary through a plurality of serving cells, namely, additional SCell using a CA technology (225).

The eNB allots an uplink wireless resource to the UE (230). When determining $P_{CMAX}$, the UE recognizes that $P_{CMAX}$ is influenced by P-MPR for power management (235). The UE selects $P_{CMAX}$ within ranges of a maximum value $P_{CMAX}\_H$ and a minimum value $P_{CMAX}\_L$ obtained from Equation 2 and Equation 3.

If at least one of following conditions is satisfied, the UE triggers PHR (240).

Condition 1: when a wireless path loss in a downward link is changed greater than one threshold dl-Pathloss-Change provided from at least one serving cell to eNB in a state that prohibitPHR-Timer is terminated Condition 2: when periodicPHR-Timer is terminated Condition 3: when PHR becomes configuration/reconfiguration form an upper layer Condition 4: when one SCell is activated together with an uplink cell Condition 5: when power backoff by P-MPR is changed by greater than a threshold dl-PathlossChange. More specifically, when UE has uplink resource for new transmission and prohibit PHR-Timer expires or has expired and the additional backoff due to power management (as allowed by P-MPR) for at least one activated serving cell has changed more than a threshold since a last transmission of PHR when the UE had UL resource (uplink grant).

The UE reports an evolved PHR to eNB (245). The evolved PHR contains 1 bit indicator P informing presence of influences of $P_{CMAX}$ and P-MPR is together with PH information. When a maximum transmission power is not influenced by P-MPR for power management, the 1 bit is set '0'. When the maximum transmission power is influenced by P-MPR for power management, the 1 bit is set '1'.

For reference, when CA is applied, the evolved PHR includes PH, PCMAX, and P value of all activated SCell. Here, the PH is calculated by a following equation 4. The PHR includes PCMAX,C only for a serving cell with valid uplink grant. Therefore, the PHR does not include a maximum transmission power for a first activated serving cell, if an uplink grant for the first activated serving cell is not allocated.

$$PH(i)=P_{CMAX,c}(i)-\{10 \log_{10}(M_{PUSCH,c}))+P_{O\_PUSCH,}(j)+\alpha_c(j)\cdot PL_c+\Delta_{TF,c}(i)+f_c(i)\}$$ Equation 4

An i-th subframe PH(i) in a serving cell c is calculated by a maximum reverse transmission power $P_{CMAX,c}(i)$, the number $M_{PUSCH,c}(i)$ of resource blocks, power offset $\Delta_{TF,c}$ induced from MCS, a pass loss $PL_c$, and $f_c(i)$ (accumulated TPC commands).

The $PL_c$ in the Equation 4 is a path loss of a cell set to provide a path loss with a serving cell c. A path loss used to determine a reverse transmission output of optional serving cell is a path loss of a forward channel of a corresponding cell or a path loss of a forward channel of another cell. The eNB selects and informs the UE in a call setting procedure to use any path.

In the Equation 4, $f_c(i)$ is an accumulated value of Transmission Power Control of a serving cell c. $P_{O\_PUSCH,C}$ is a parameter in an upper layer, which is a sum of cell-specific and UE-specific. In general, different values are applied to $P_{O\_PUSCH,C}$ according to Physical Uplink Shared Channel (PUSCH) transmission types such as semi-persistent scheduling, dynamic scheduling, and random access response.

$\alpha_c$ is 3-bit cell-specific value provided in an upper layer. When a reverse transmission output is calculated, it is a weight (the higher a weight applied to a path loss is, it greatly influences a reverse transmission output) applied to path loss, and an applicable value is limited to $\alpha_c$ according to a type of PUSCH transmission.

A j value is used to indicate a type of PUSCH. When J=0, it indicates semi-persistent scheduling. When j=1, it indicates dynamic scheduling. When j=2, it indicates random access response.

Next, the eNB makes database of corresponding information and is used for scheduling (250).

Figure 3A:
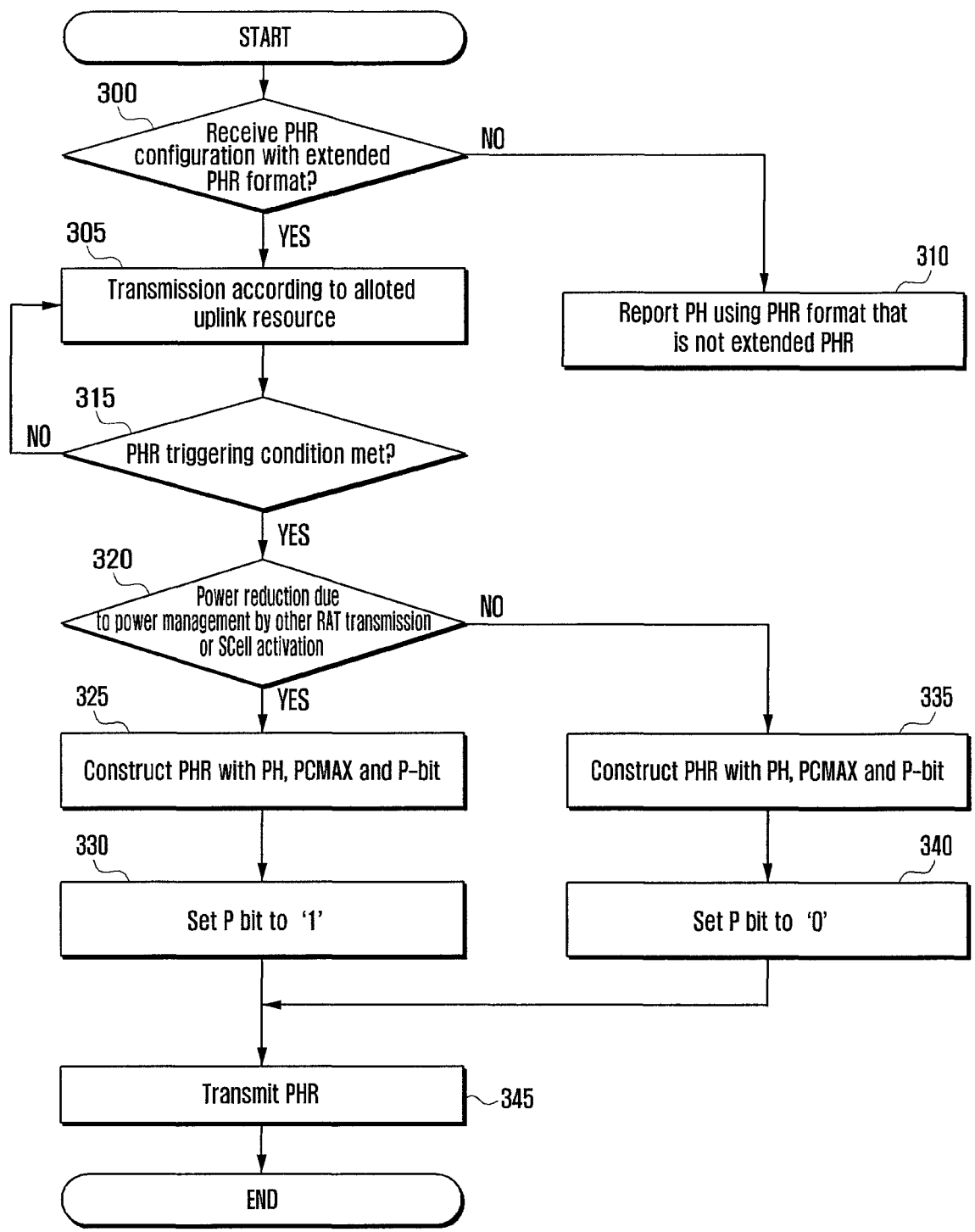
FIG. 3A is a flowchart illustrating a method of transmitting the PHR by a UE according to an embodiment of the present disclosure.

FIG. 3A is a flowchart illustrating a method of transmitting the PHR by a UE according to an embodiment of the present disclosure.

A UE determines whether there is an instruction to apply an evolved PHR format among PHR setting information provided from the eNB (300). If there is no instruction, the UE reports PHR using a conventional PH format (310). The PHR is used for a single serving cell. The UE triggers PHR which means that the UE generates the PHR MAC CE whose payload consists with PH field and Pcmax field. The UE includes the current PH in the PH field wherein current PH is the difference between the Pcmax and the required transmission power. UE includes Pcmax in the Pcmax field.

The UE transmits data according to allotment of an uplink wireless resource (305), and continuously determines whether PHR trigger conditions meet (315).

If at least one of the PHR trigger conditions meets, the UE determines whether a $P_{CMAX}$ value to be reported is influenced by P-MPR in a power management side (320).

If the $P_{CMAX}$ value is influenced by the P-MPR, the UE configures an evolved PHR (325), and sets a P bit value to 1 (330). If the $P_{CMAX}$ value is not influenced by the P-MPR, the UE configures an evolved PHR (335), and sets a P bit value to 0 (340).

The UE reports the PHR to the eNB (345).

Figure 3B:
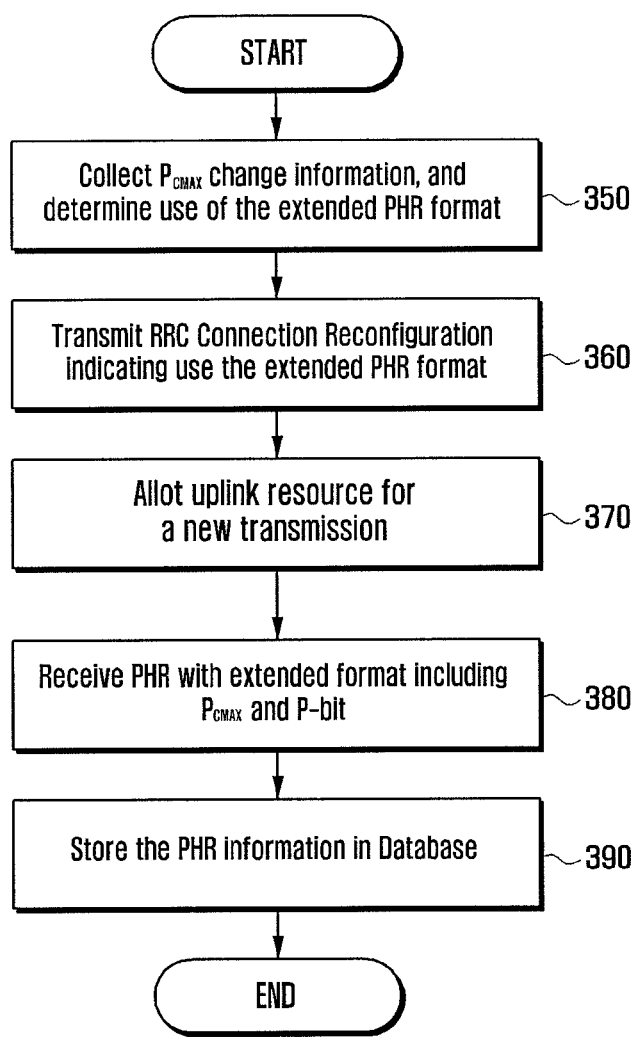
FIG. 3B is a flowchart illustrating a method of receiving the PHR by an eNB according to an embodiment of the present disclosure.

FIG. 3B is a flowchart illustrating a method of receiving the PHR by an eNB according to an embodiment of the present disclosure.

An eNB determines collection of information with respect to $P_{CMAX}$ variation for various situations (350). That is, the eNB determines using an evolved PHR format according to an embodiment of the present disclosure.

The eNB instructs the UE to apply an evolved PHR format through an RRC Connection Reconfiguration message (360). Presence of application of the evolved PHR format is instructed through MAC-MainConfig IE, and PHR relation setting information is included in the PHR-config IE. Next, the eNB allots an uplink wireless resource to the UE (370).

The eNB receives an evolved PHR from the UE (380). As illustrated above, the evolved PHR includes a 1 bit indicator P for information presence of influence of $P_{CMAX}$ and P-MPR as well as PH information. If maximum transmission power is not influenced by P-MPR for power management, the 1 bit is set to '0'. If maximum transmission power is influenced by P-MPR for power management, the 1 bit is set to '1'. For reference, when CA is applied, the evolved PHR includes PH, $P_{CMAX}$, and P value of all activated SCells.

Next, the eNB makes database of corresponding information to be used for scheduling (390).

Figure 4:
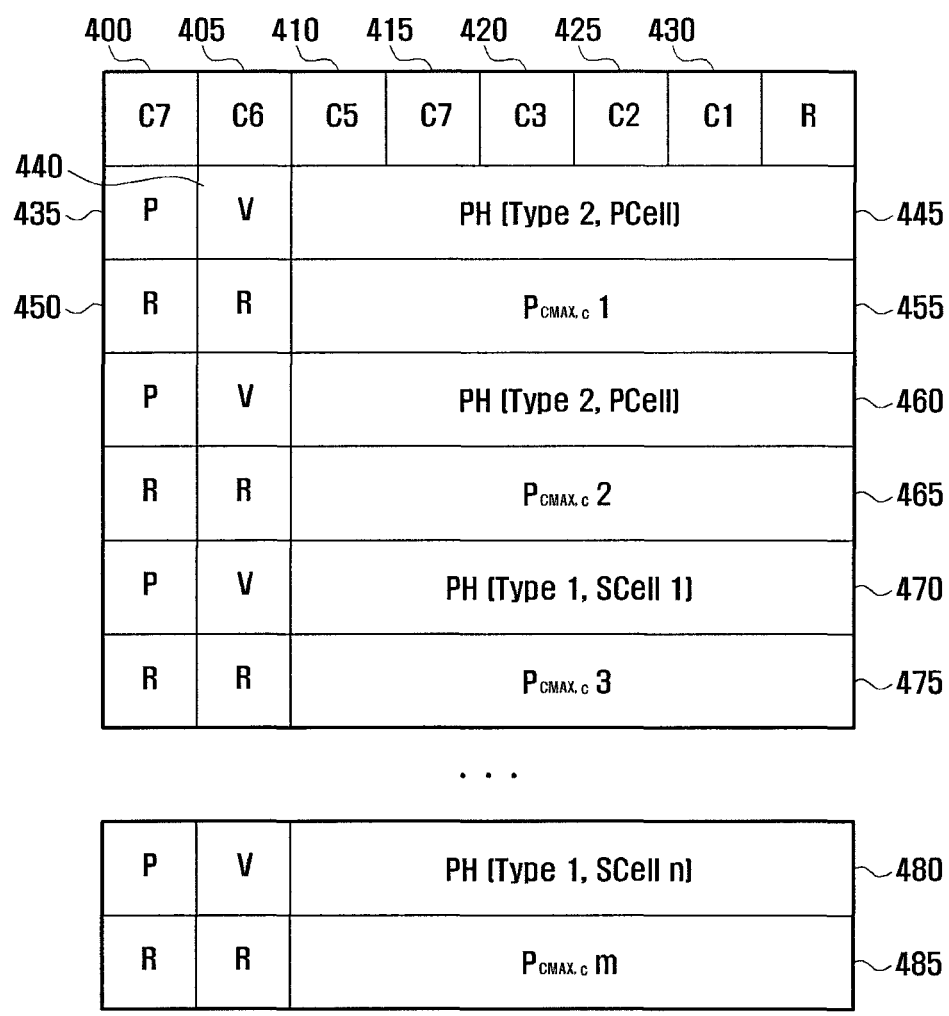
FIG. 4 is a view illustrating a construction of an enlarge PHR according to an embodiment of the present disclosure.

FIG. 4 is a view illustrating a PHR arrangement for describing PHR arrangement of steps 325 and 335 in FIG. 3A.

When a PH with respect to a plurality of serving cells is reported in a mobile communication system in which a plurality of carriers are integrated, they are collected in one PHR to be transmitted. Such a method may reduce a signal overhead in comparison with transmission of PH by carriers, and may obtain PH information with respect to a carrier in which there is no actual PUSCH transmission.

Blocks 400 to 430 are a bitmap for instructing whether a PH of any activated Component Carrier (CC) is included in a corresponding PHR. Each bit of the bitmap accords with SCell index, and corresponds to one SCell.

A block 435 is a P bit, and instructs whether terminal maximum transmission power $P_{CMAX}$ is influenced by P-MRP according to the present disclosure.

Although there is no actual PUSCH transmission, the eNB may trigger a PHS so as to obtain path loss information in a specific reverse carrier. When there is no PUSCH transmission, the UE and eNB may solve by determining a transmission format (amount and MSC level of transmission resource) to be used in order to calculate a PH.

In this case, the eNB should know whether a PH with respect to each serving cell included in PHR is calculated in consideration of actual PUSCH transmission or using a previously defined transmission format. To do this, there is a need for an indicator for information it to a conventional PHR format. A V bit of a block 440 is a 1 bit indicator therefor.

When calculating a PH of the cell in reporting a PH of an optional cell, if calculating the PH based on actual PUSCH transmission, namely, using an actual transmission format, the UE sets the bit to a predetermined value (e.g., 0). When calculating the PH using a reference format (namely, the number of RBs=0, ΔTF=0), the UE sets the bit to another value (e.g., 1).

Blocks 450 and 455 are PH and $P_{CMAX}$ values, respectively. PH information of each carrier in continuous bytes is configured in an ascending order of Type 2 PH and $P_{CMAX}$ of PCell→Type 1 PH (block 460) and $P_{CMAX}$ (block 465) of PCell→PH (block 470) and $P_{CMAX}$ (block 475) of a first SCell→PH and $P_{CMAX}$ of a second SCell→PH and $P_{CMAX}$ of a third SCell→PH and $P_{CMAX}$ of of a fourth SCell. R (block 450) is a reserved bit.

Figure 5:
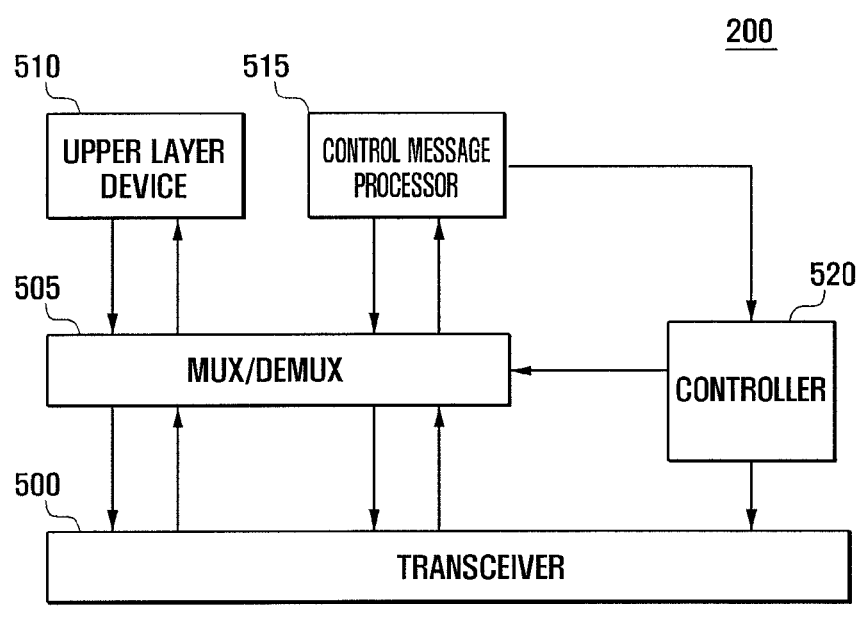
FIG. 5 is a block diagram illustrating a configuration of a PHR transmitting device of a UE according to an embodiment of the present disclosure.

FIG. 5 is a block diagram illustrating a configuration of a UE 200 according to an embodiment of the present disclosure.

The terminal includes an upper layer device 51 transmitting/receiving an upper link and data, and transmits/receive control message through a control message processor 515.

Further, when transmitting a control signal or data to the eNB 205, the UE multiplexes it through a multiplexer/demultiplexer (MUX/DeMUX) 505 under the control of the controller 520 and transmits data through a transceiver 500.

Meanwhile, when receiving data, the UE receives a physical signal by a transceiver 500 under the control of the controller 520, demultiplexes a received signal by a multiplexer/demultiplexer (MUX/DeMUX) 505, and transfers a received signal to an upper layer device 501 or a control message processor 515 according to each message information.

According to the present disclosure, an eNB may know maximum transmission power of an UE and a variation factor thereof to enable efficient scheduling.

Although exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A method performed by a user equipment (UE) in a wireless communication system, the method comprising:
identifying whether a power headroom report (PHR) is triggered; and transmitting, to a base station, the PHR in case that the PHR is triggered,
wherein the PHR is triggered in case that a PHR prohibit timer expires or has expired, the UE has an uplink resources for a new transmission, a power backoff due to power management for any of activated serving cell has changed by more than a threshold since a last transmission of another PHR,
wherein, in case that the PHR is for single serving cell, the PHR includes a power headroom (PH) for the single serving cell and a maximum transmission power used to calculate the PH, and
wherein, in case that the PHR is for multiple serving cells, the PHR includes PHs for each of activated serving cells and information indicating whether the UE applies the power backoff due to power management.

2. The method of claim 1, in case that the PHR is for the multiple serving cells:
wherein the PHR does not include information on a maximum transmission power for a first activated serving cell without a valid uplink grant, and
wherein the PHR further includes a maximum transmission power for a second activated serving cell with the valid uplink grant.

3. The method of claim 1, wherein a lower bound of the maximum transmission power is determined based on power management.

4. The method of claim 1, further comprising:
receiving, from the base station, PHR configuration information including the threshold.

5. The method of claim 1, wherein the PHR further includes bitmap information indicating a presence of PH per serving cells in case that the PHR is for the multiple serving cells.

6. A method performed by a base station in a wireless communication system, the method comprising:
transmitting, to a user equipment (UE), power headroom report (PHR) configuration information; and
receiving, from the UE, a PHR in case that the PHR is triggered,
wherein the PHR is triggered in case that a PHR prohibit timer expires or has expired, the UE has an uplink resources for a new transmission, a power backoff due to power management for any of activated serving cell has changed by more than a threshold since a last transmission of another PHR,
wherein, in case that the PHR is for single serving cell, the PHR includes a power headroom (PH) for the single serving cell and a maximum transmission power used to calculate the PH, and
wherein, in case that the PHR is for multiple serving cells, the PHR includes PHs for each of activated serving cells and information indicating whether the UE applies the power backoff due to power management.

7. The method of claim 6, in case that the PHR is for the multiple serving cells:
wherein the PHR does not include information on a maximum transmission power for a first activated serving cell without a valid uplink grant, and
wherein the PHR further includes a maximum transmission power for a second activated serving cell with the valid uplink grant.

8. The method of claim 6, wherein a lower bound of the maximum transmission power is determined based on power management.

9. The method of claim 6, wherein the PHR configuration information includes the threshold.

10. The method of claim 6, wherein the PHR further includes bitmap information indicating a presence of PH per serving cells in case that the PHR is for the multiple serving cells.

11. A user equipment (UE) in a wireless communication system, the UE comprising:
a transceiver; and
a controller configured to:
identify whether a power headroom report (PHR) is triggered, and
transmit, to a base station via the transceiver, the PHR in case that the PHR is triggered,
wherein the PHR is triggered in case that a PHR prohibit timer expires or has expired, the UE has an uplink resources for a new transmission, a power backoff due to power management for any of activated serving cell has changed by more than a threshold since a last transmission of another PHR,
wherein, in case that the PHR is for single serving cell, the PHR includes a power headroom (PH) for the single serving cell and a maximum transmission power used to calculate the PH, and
wherein, in case that the PHR is for multiple serving cells, the PHR includes PHs for each of activated serving cells and information indicating whether the UE applies the power backoff due to power management.

12. The UE of claim 11, in case that the PHR is for the multiple serving cells:
wherein the PHR does not include information on a maximum transmission power for a first activated serving cell without a valid uplink grant, and
wherein the PHR further includes a maximum transmission power for a second activated serving cell with the valid uplink grant.

13. The UE of claim 11, wherein a lower bound of the maximum transmission power is determined based on power management.

14. The UE of claim 11, wherein the controller is further configured to receive, from the base station via the transceiver, PHR configuration information including the threshold.

15. The UE of claim 11, wherein the PHR further includes bitmap information indicating a presence of PH per serving cells in case that the PHR is for the multiple serving cells.

16. A base station in a wireless communication system, the base station comprising:
a transceiver; and
a controller configured to:
transmit, to a user equipment (UE) via the transceiver, power headroom report (PHR) configuration information, and
receive, from the UE via the transceiver, a PHR in case that the PHR is triggered,
wherein the PHR is triggered in case that a PHR prohibit timer expires or has expired, the UE has an uplink resources for a new transmission, a power backoff due to power management for any of activated serving cell has changed by more than a threshold since a last transmission of another PHR,
wherein, in case that the PHR is for single serving cell, the PHR includes a power headroom (PH) for the single serving cell and a maximum transmission power used to calculate the PH, and
wherein, in case that the PHR is for multiple serving cells, the PHR includes PHs for each of activated serving cells and information indicating whether the UE applies the power backoff due to power management.

17. The base station of claim 16, in case that the PHR is for the multiple serving cells:
- wherein the PHR does not include information on a maximum transmission power for a first activated serving cell without a valid uplink grant, and
- wherein the PHR further includes a maximum transmission power for a second activated serving cell with the valid uplink grant.

18. The base station of claim 16, wherein a lower bound of the maximum transmission power is determined based on power management.

19. The base station of claim 16, wherein the PHR configuration information includes the threshold.

20. The base station of claim 16, wherein the PHR further includes bitmap information indicating a presence of PH per serving cells in case that the PHR is for the multiple serving cells.

\* \* \* \* \*